United States Patent
Li et al.

(10) Patent No.: US 8,391,879 B2
(45) Date of Patent: *Mar. 5, 2013

(54) METHODS AND APPARATUS FOR SUPPORTING DISTRIBUTED SCHEDULING USING QUALITY OF SERVICE INFORMATION IN A PEER TO PEER NETWORK

(75) Inventors: Junyi Li, Bedminster, NJ (US); Saurabh Tavildar, Jersey City, NJ (US); Rajiv Laroia, Far Hills, NJ (US); Gavin Horn, La Jolla, CA (US); Ashwin Sampath, Princeton, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1150 days.

This patent is subject to a terminal disclaimer.

(21) Appl. No.: 12/267,888

(22) Filed: Nov. 10, 2008

(65) Prior Publication Data

US 2010/0120372 A1    May 13, 2010

(51) Int. Cl.
  *H04W 72/00* (2009.01)
(52) U.S. Cl. ............. 455/452.2; 455/513; 455/135; 455/161.3; 455/277.3
(58) Field of Classification Search .......... 455/522, 455/67.11, 68–70, 115.3, 126, 127.1, 127.2, 455/135, 226.3, 277.2, 296, 452.2, 161.3, 455/513; 370/318
See application file for complete search history.

(56) References Cited

U.S. PATENT DOCUMENTS

| | | | |
|---|---|---|---|
| 7,239,882 B1 * | 7/2007 | Cook | 455/519 |
| 7,376,100 B2 * | 5/2008 | Chang | 370/329 |
| 7,599,321 B2 * | 10/2009 | Lee et al. | 370/320 |
| 2006/0274713 A1 | 12/2006 | Pandey et al. | |
| 2007/0109989 A1 * | 5/2007 | Nakagawa et al. | 370/328 |
| 2007/0281720 A1 | 12/2007 | Lee | |
| 2009/0011711 A1 * | 1/2009 | Kawasaki et al. | 455/62 |

FOREIGN PATENT DOCUMENTS

| | | |
|---|---|---|
| KR | 20060098360 A | 9/2006 |
| WO | WO2006124042 A1 | 11/2006 |
| WO | WO2009009352 A1 | 1/2009 |
| WO | WO2009114273 A1 | 9/2009 |

OTHER PUBLICATIONS

International Search Report and Written Opinion—PCT/US2009/063425—ISA/EPO—Mar. 26, 2010.

* cited by examiner

*Primary Examiner* — Dominic E Rego
(74) *Attorney, Agent, or Firm* — Peng Zhu; Paul S. Holdaway

(57) ABSTRACT

Methods and apparatus well suited to decentralized traffic scheduling in wireless peer to peer network are described. An individual wireless terminal corresponding to a peer to peer connection makes a transmitter yielding or receiver yielding decision for a traffic slot. Quality of service information is disseminated as part of the scheduling control signaling. A scheduling control signal, e.g., a traffic transmission request signal or a traffic transmission request response signal, includes a pilot portion and a quality of service information portion. The pilot facilitates the recovery of the quality of service information by a plurality of different devices which may have different channel conditions with respect to the transmitter of the scheduling control signal. The different devices may benefit from utilizing the recovered quality of service information in making a yielding decision regarding traffic signaling in a traffic segment.

28 Claims, 12 Drawing Sheets

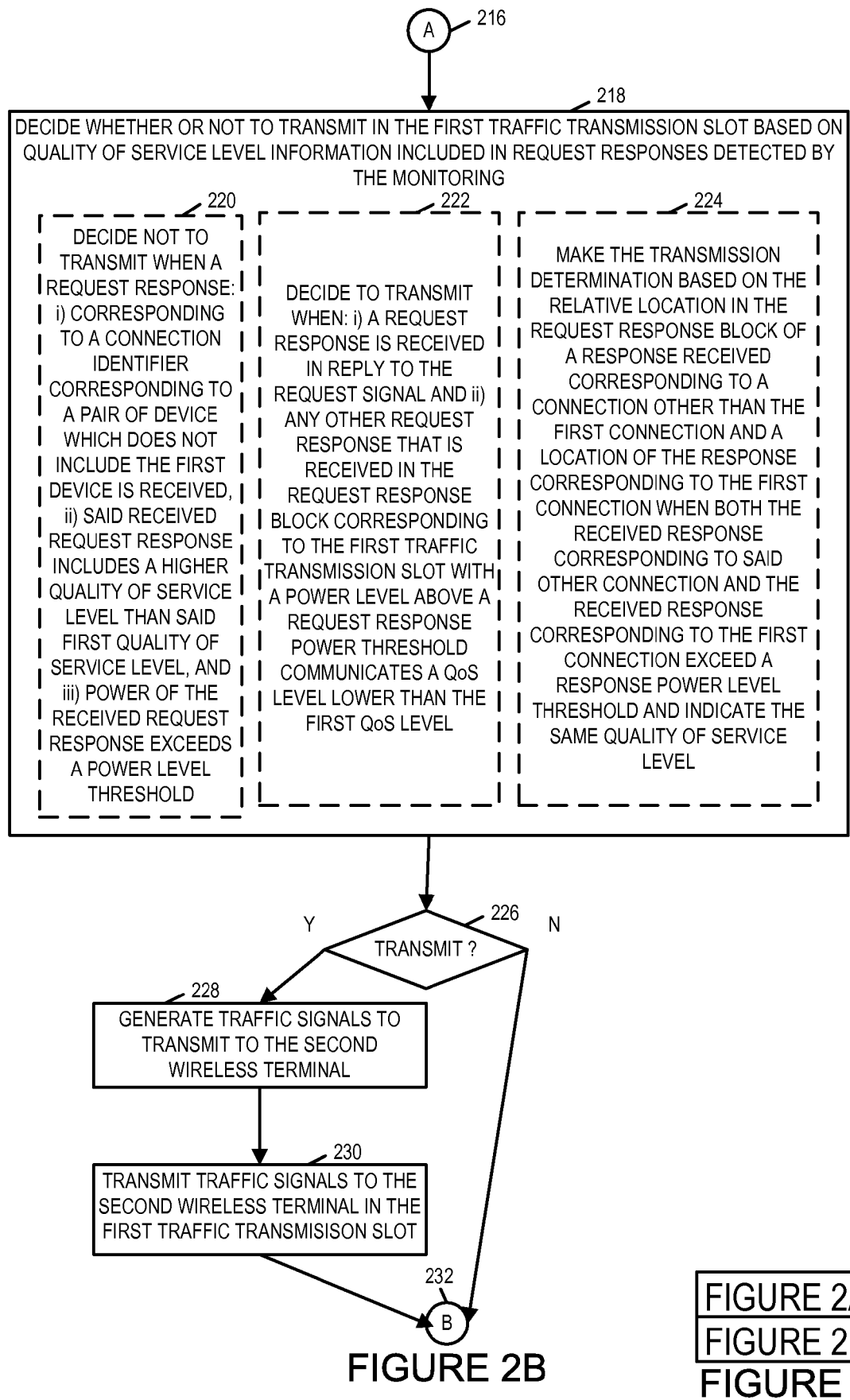

METHODS AND APPARATUS FOR SUPPORTING DISTRIBUTED SCHEDULING USING QUALITY OF SERVICE INFORMATION IN A PEER TO PEER NETWORK

FIELD

Various embodiments relate to wireless communications, and more particularly, to methods and apparatus related to peer to peer communications.

BACKGROUND

In wireless communications networks lacking centralized control efficient scheduling of traffic air link resources can be a difficult task. An approach of allocating each connection the same weighting or the same amount of air link traffic resources although simple in design tends to be wasteful. At different times, a particular communications device corresponding to a connection may have different quality of service needs, e.g., due to: the type of data to be communicated, latency considerations, backlog, current channel conditions, congestion, application being executed, etc. Different types of devices may also have different quality of quality of service needs, e.g., corresponding to device capabilities. The same device may also have different quality of service needs at different times based on the capabilities of the other device with which it has a current connection. Thus at different times the importance of a particular device being allowed to use a traffic segment may be expected to vary.

If distributed scheduling techniques are employed for traffic scheduling it can be beneficial for the individual devices making the scheduling decisions to be situationally aware of the current needs of other devices competing to use the same resources. In view of the above there is a need for novel methods and apparatus which support the exchange of quality of service information between communications devices situated in a vicinity which are competing to use the same air link traffic resources. Since utilization of air link resources for control signaling tends to make those air link resources unavailable for traffic signaling, it would be advantageous if such methods and apparatus efficiently structured the control signaling to tend to minimize overhead.

SUMMARY

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. In some embodiments individual wireless terminals corresponding to a peer to peer connection which desire to communicate traffic signals make transmitter yielding and/or receiver yielding decisions on a traffic slot by traffic slot basis. One feature of various embodiments includes the communication of quality of service information between wireless communications devices as part of the scheduling signaling. In some embodiments, a traffic transmission request signal includes a pilot portion and a quality of service information portion. In some embodiments, a traffic transmission request response signal includes a pilot portion and a quality of service information portion. The inclusion of a pilot with quality of service information in a scheduling control signal facilitates the recovery of the quality of service information by a plurality of different devices which may have different channel conditions with respect to the transmitter of the scheduling control signal. The different devices may benefit from utilizing the recovered quality of service information in making a yielding decision regarding traffic signaling in a traffic segment. In some embodiments quality of service levels communicated in scheduling control signals are utilized to adjust priority, satisfy current quality of service needs, and/or balance competing traffic resource needs.

An exemplary method of operating a first wireless terminal includes: when said first wireless terminal has data to be transmitted to a second wireless terminal, determining a first quality of service level to be used for data to be transmitted in a first traffic transmission slot; and transmitting a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers.

An exemplary first wireless terminal in accordance with one embodiment includes at least one processor configured to: determine, when said first wireless terminal has data to be transmitted to a second wireless terminal, a first quality of service level to be used for data to be transmitted in a first traffic transmission slot; and transmit a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers. The exemplary first wireless terminal further includes a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
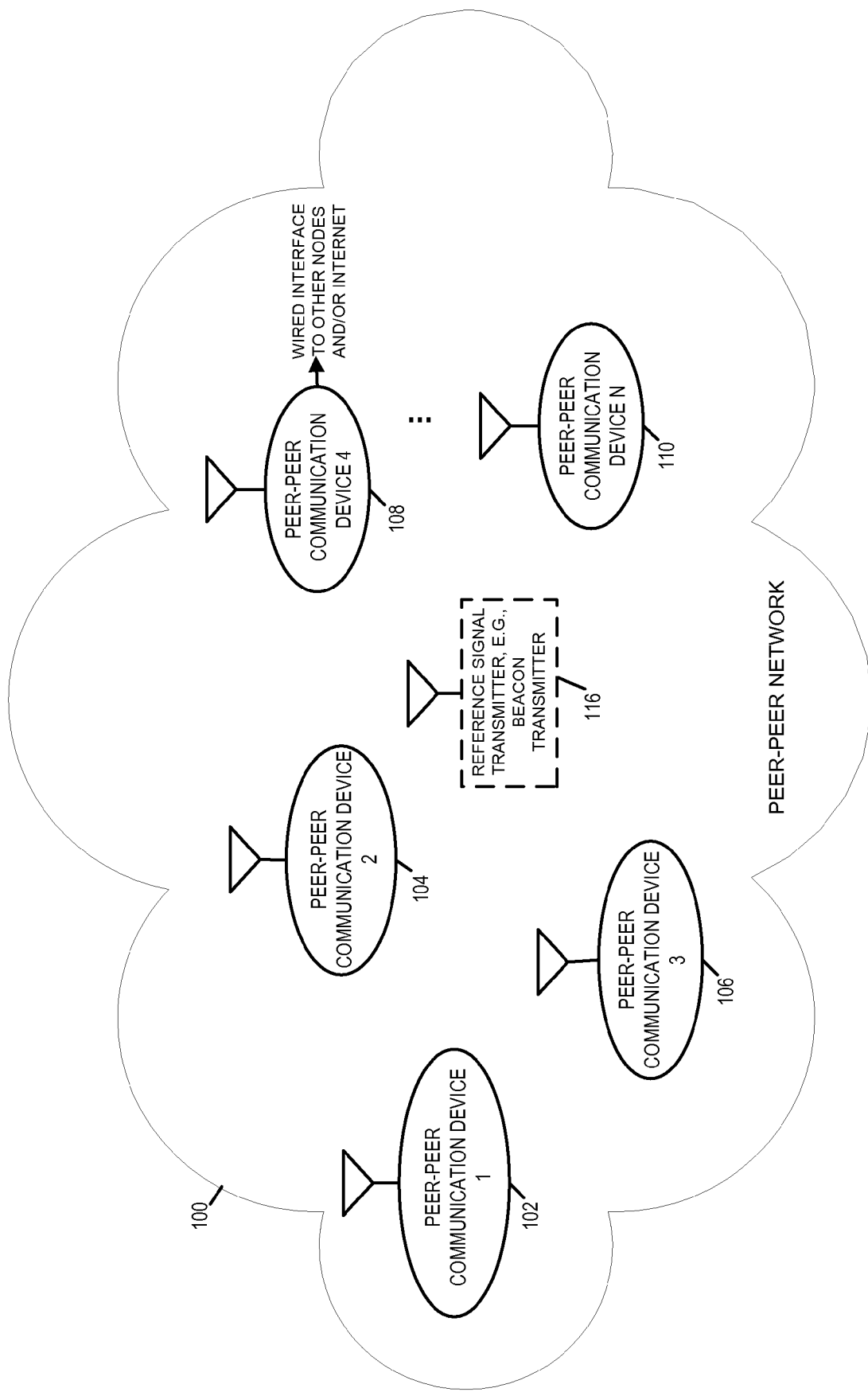
FIG. 1 is a drawing of an exemplary peer to peer network, e.g., an ad-hoc communications network, in accordance with an exemplary embodiment.

FIG. 1 is a drawing of an exemplary peer to peer network 100, e.g., an ad-hoc communications network, in accordance with an exemplary embodiment. The exemplary network supports peer to peer traffic signaling by communication devices, e.g., mobile wireless terminals. The exemplary network 100 supports decentralized scheduling of traffic air link resources, e.g., segments, on a slot by slot basis. In some embodiments, the scheduling is based on quality of service level information corresponding to different connections competing to use the same traffic air link resource. Exemplary peer to peer network 100 includes a plurality of wireless devices (peer to peer communications device 1 102, peer to peer communications device 2 104, peer to peer communications device 3 106, peer to peer communications device 4 108, . . . , peer to peer communications device N 110) supporting peer to peer traffic signaling. In some embodiments, the network 100 includes a reference signal transmitter 116, e.g., a beacon transmitter. The wireless devices (102, 104, 106, 108, . . . , 110) in the communications network 100 can establish connections with one another, e.g., peer to peer connections, generate and transmit traffic transmission request signals, e.g., multi-part request signals including a pilot portion and a quality of service portion, receive and process traffic transmission request signals, make receiver yielding decisions, generate and transmit traffic transmission request response signals, e.g., multi-part request response signals including a pilot portion and a quality of service portion, receive and process traffic transmission request response signals, make transmitter yielding decisions, receive peer to peer traffic signals, and transmit peer to peer traffic signals. There is a recurring timing structure used in the network 100. In some embodiments a reference signal, e.g., an OFDM beacon signal from reference signal transmitter 116, is used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots.

Figure 2A:
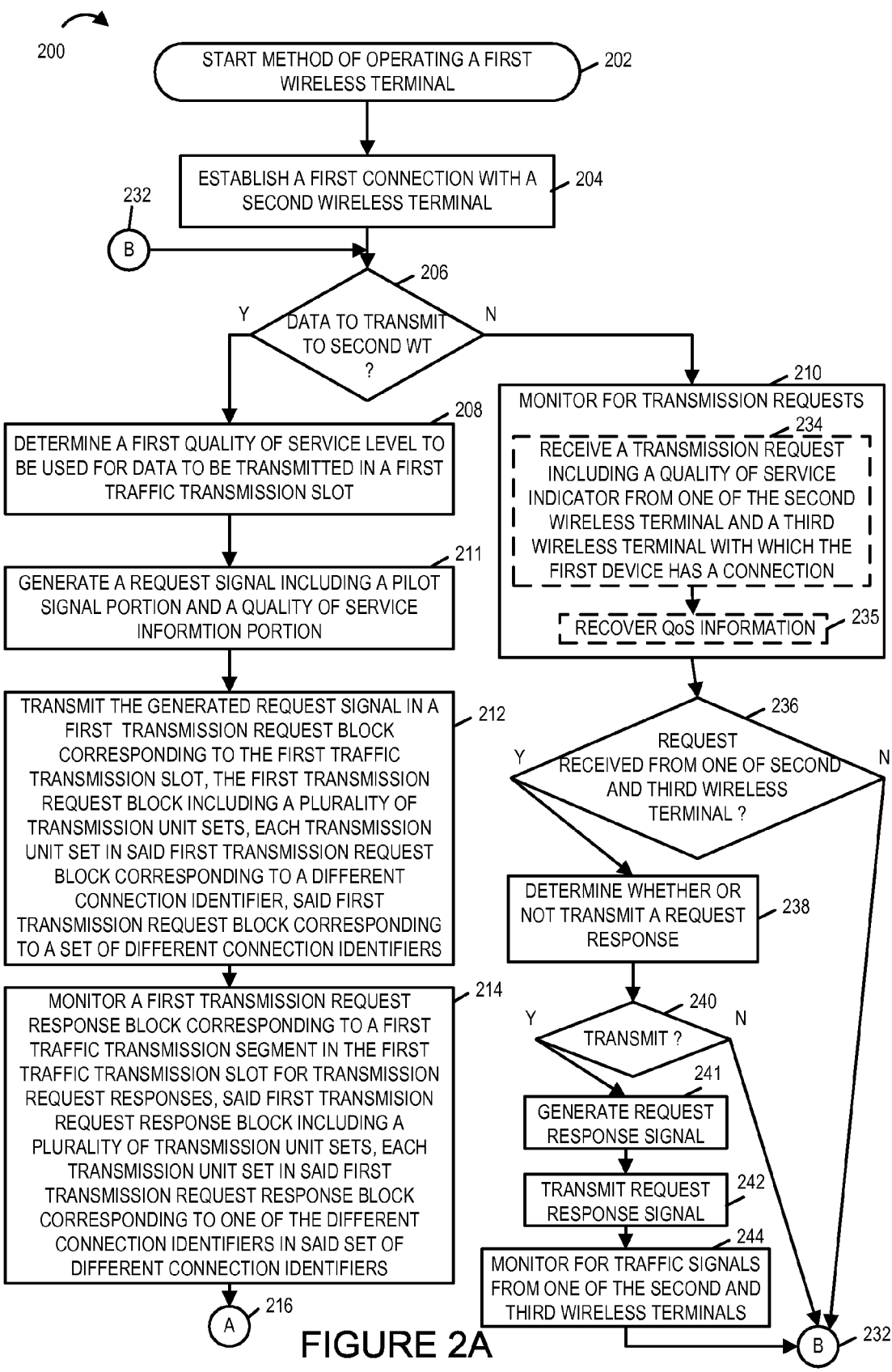
FIG. 2, comprising the combination of FIG. 2A and FIG. 2B, is a flowchart of an exemplary method of operating a wireless terminal.

FIG. 2, comprising the combination of FIG. 2A and FIG. 2B, is a flowchart 200 of an exemplary method of operating a first wireless terminal, e.g., a peer to peer mobile node, to implement a method of communicating with one or more other communications devices. The exemplary method of flowchart 200 is well suited for peer to peer communications networks, e.g., an ad hoc peer to peer network implementing decentralized control. Operation starts in step 202, where the first wireless terminal is powered on and initialized and proceeds to step 204. In step 204, the first wireless terminal establishes a first connection with a second wireless terminal, e.g., another peer to peer mobile node. Operation proceeds from step 204 to step 206.

In step 206, the first wireless terminal determines if it has data, e.g., traffic data including image data, audio data and/or text data, to transmit to second wireless terminal. If the first wireless terminal determines that it has data to transmit to the second wireless terminal, then operation proceeds from step 206 to step 208; otherwise, operation proceeds from step 206 to step 210.

In step 208 the first wireless terminal determines a first quality of service level to be used for data to be transmitted in a first traffic transmission slot. Operation proceeds from step 208 to step 211. In step 211 the first wireless terminal generates a request signal including a pilot signal portion and a quality of service (QoS) information portion. The QoS information portion conveys the determined first quality of service level.

Operation proceeds from step 211 to step 212. In step 212 the first wireless terminal transmits the generated request signal in a first traffic transmission request block corresponding to the first traffic transmission slot, the first traffic transmission request block including a plurality of transmission unit sets, each transmission unit set in said first transmission request block corresponding to a different connection identifier, said transmission request block corresponding to a set of different connection identifiers. In some embodiments, the request signal is communicated using a transmission unit used to communicate a request pilot signal and one or more additional data units used to communicate the first quality of service level.

Operation proceeds from step 212 to step 214. In step 214 the first wireless terminal monitors a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers. Operation proceeds from step 214 via connecting node A 216 to step 218.

In step 218 the first wireless terminal decides whether or not to transmit in the first traffic transmission slot based on quality of service information included in request responses detected by the monitoring. Step 218 includes one or more of sub-steps 220, 224 and 224. In sub-step 224, the first wireless terminal decides not to transmit when a request response: i) corresponding to a connection identifier corresponding to a pair of device which does not include the first device is received; ii) said received request response includes a higher quality of service level than the first quality of service level; and iii) the power of the received request response exceeds a power threshold. In sub-step 222 the first device decides to transmit when: i) a request response is received in reply to the request signal; and ii) any other request response received in a request response block corresponding to the first traffic slot with a power level above a request response threshold communicates a QoS level lower than the first QoS level. In some such embodiments, the power level threshold is dynamically determined from one transmission time slot to the next based on received signals. In sub-step 224, the first wireless terminal makes the determination based on the relative location in the request response block of a response received corresponding to a connection other than the first connection and a location of the response corresponding to the first connection when both the received response corresponding to the other connection and the received response corresponding to the first connection exceed a response power level threshold and indicate the same quality of service level.

Operation proceeds from step 218 to step 226. In step 226 the first wireless terminal proceeds differently depending upon the decision whether or not to transmit data in the first traffic transmission slot. If the decision of step 218 is to transmit, then operation proceeds from step 226 to step 228. However, if the decision of step 216 is not to transmit, then operation proceeds from step 226 to connecting node B 232.

Returning to step 228, in step 228 the first wireless terminal generates traffic signals to transmit to second wireless terminal. Operation proceeds from step 228 to step 230, in which the first wireless terminal transmits the generated traffic signals to the second wireless terminal in the first traffic segment of the first traffic transmission slot. Operation proceeds from step 230 to connecting node B 232.

Returning to step 210, in step 210 the first wireless terminal monitors for transmission requests, e.g., in the first transmission request block. Step 210 may, and sometimes does, include sub-step 234 and sub-step 235. In sub-step 234 the first wireless terminal receives a transmission request including a quality of service indicator from one of the second wireless terminal and a third wireless terminal with which the first device has a connection. The received transmission request signal also includes a pilot signal portion. In sub-step 235 the first wireless terminal recovers QoS information, e.g., a QoS level, conveyed in the received transmission request signal. In some embodiments the recovery includes processing the pilot signal portion to obtain a phase and/or amplitude reference and then processing the QoS portion using the obtained phase and/or amplitude reference to recover the QoS level. Operation proceeds from step 210 to step 236.

In step 236 the first wireless terminal proceeds differently depending upon whether or not the first wireless terminal has received a request from one the second and third wireless terminals. If the first wireless terminal has received a request from one of the second and third wireless terminals, then operation proceeds from step 236 to step 238; otherwise, operation proceeds from step 236 to connecting node B 232.

Returning to step 238, in step 238 the first wireless terminal determines whether or not to transmit a request response, e.g., the first wireless terminal makes a receiver yielding decision. Operation proceeds from step 238 to step 240. If the decision of step 238 is not to transmit a request response, then operation proceeds from step 240 to connecting node B 232; otherwise, operation proceeds from step 240 to step 241. In step 241 the first wireless terminal generates a request response signal. In some embodiments, the generated request response signal includes a pilot signal portion and a quality of service information signal potion. In some such embodiments, the quality of service information portion is an echo of the recovered quality of service information, e.g. QoS level, recovered in sub-step 235. Operation proceeds from step 241 to step 242. In step 242 the first wireless terminal transmits the generated request response signal in response to the received transmission request of sub-step 234, which in this embodiment signifies a positive response to the request. Then, in step 244 the first wireless terminal monitors of traffic signals from one of the second and third wireless terminals. Operation proceeds from step 244 to connecting node B 232.

Operation proceeds from connecting node B 232 to the input of step 206 where the first wireless terminal again considers whether or not it has data to transmit to the second wireless terminal, e.g., in a subsequent transmission slot in the recurring timing structure.

Figure 3:
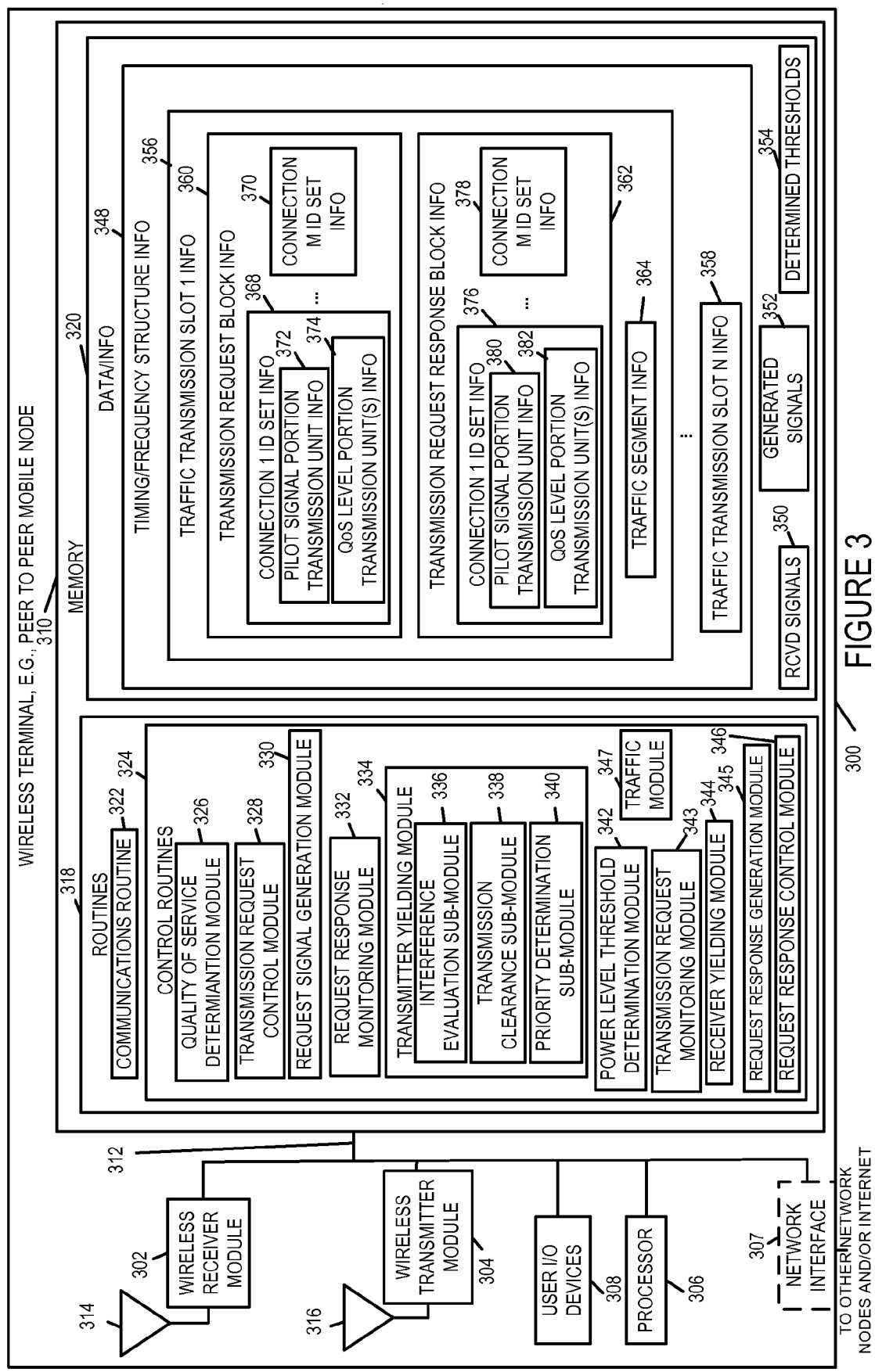
FIG. 3 is a drawing of an exemplary wireless terminal, a peer to peer mobile node, in accordance with an exemplary embodiment.

FIG. 3 is a drawing of an exemplary wireless terminal 300, e.g., a peer to peer mobile node, in accordance with an exemplary embodiment. Exemplary wireless terminal 300 is, e.g., one of the communications devices of FIG. 1. Exemplary wireless terminal 300 includes a wireless receiver module 302, a wireless transmitter module 304, user I/O devices 308, a processor 306, and a memory 310 coupled together via a bus 312 over which the various elements may interchange data and information. In some embodiments, wireless terminal 300 also includes a network interface 307 coupled to bus 312. Via network interface 307, the wireless terminal 300 can be coupled to network nodes and/or the Internet.

Memory 310 includes routines 318 and data/information 320. The processor 306, e.g., a CPU, executes the routines 318 and uses the data/information 320 in memory 310 to control the operation of the wireless terminal 300 and implement methods, e.g., the method of flowchart 200 of FIG. 2.

Wireless receiver module 302, e.g., an OFDM and/or CDMA receiver, is coupled to receive antenna 314 via which the wireless terminal 300 receives signals from other wireless terminals. Received signals include, e.g., connection establishment signals, transmission request signals, transmission request response signals, and peer to peer traffic signals.

Wireless transmitter module 304, e.g., an OFDM and/or CDMA transmitter, is coupled to transmit antenna 316 via which the wireless terminal 300 transmits signals to other wireless terminals. Transmitted signals include, e.g., connection establishment signals, transmission request signals, request response signals, and peer to peer traffic signals. In some embodiments, the same antenna is used for receiver and transmitter.

Routines 318 include a communications routine 322 and control routines 324. The communications routine 322 implements the various communications protocols used by the wireless terminal 300. Control routines 324 include a quality of service determination module 326, a transmission request control module 328, a request signal generation module 330, a request response monitoring module 332, a transmitter yielding module 334, a power level threshold determination module 342, a transmission request monitoring module 343, a receiver yielding module 344, a request response generation module 345, a request response control module 346, and a traffic module 347. Transmitter yielding module 334 includes an interference evaluation sub-module 336, a transmission clearance sub-module 338 and a priority determination sub-module 340.

Data/information 320 includes timing/frequency structure information 348, received signals 350, generates signals 352 and determined thresholds 354. Timing/frequency structure information 348 includes information corresponding to a plurality of traffic transmission slots in a recurring timing structure (traffic transmission slot 1 information 356, . . . , traffic transmission slot N information 358). Traffic transmission slot 1 information 356 includes transmission request block information 360, transmission request response block information 362 and traffic segment information 364. Traffic transmission request block information 370 identifies a block of air link resources, e.g., OFDM tone-symbols, to be used for conveying traffic transmission request signals requesting to transmit traffic signals in the segment identified by traffic segment information 364. Traffic transmission request response block information 362 identifies a block of air link resources, e.g., OFDM tone-symbols, to be used for conveying traffic transmission request response signals, e.g., signals indicating a positive response to a corresponding traffic transmission request to transmit traffic signals in the segment identified by information 364. Traffic segment information 364 includes information identifying a set of air link resources, e.g. OFDM tone-symbols to be used to convey traffic signals, e.g., peer to peer traffic signals, for traffic transmission slot 1. Transmission request block information 360 includes information corresponding to a plurality of different connection identifiers (connection 1 ID set information 368, . . . , connection M ID set information 370). Connection 1 ID set information 368 includes pilot signal portion transmission unit information 372 and QoS level portion transmission unit(s) information 374. Pilot signal portion transmission unit information 372 includes information identifying a transmission unit, e.g., an OFDM tone-symbol, to be used for conveying a pilot signal portion of a traffic transmission request signal for connection with connection ID 1 in the transmission request block for traffic transmission slot 1 in the recurring timing structure. QoS signal portion transmission unit(s) information 374 includes information identifying one or more additional transmission unit, e.g., one or more additional OFDM tone-symbols, to be used for conveying a QoS level of a traffic transmission request signal for connection with connection ID 1 in the transmission request block for traffic transmission slot 1 in the recurring timing structure. Transmission request response block information 362 includes information corresponding to a plurality of different connection identifiers (connection 1 ID set information 376, . . . , connection M ID set information 378). Connection 1 ID set information 376 includes pilot signal portion transmission unit information 380 and QoS level portion transmission unit(s) information 382. Pilot signal portion transmission unit information 380 includes information identifying a transmission unit, e.g., an OFDM tone-symbol, to be used for conveying a pilot signal portion of a traffic transmission request response signal for connection with connection ID 1 in the transmission request response block for traffic transmission slot 1 in the recurring timing structure. QoS signal portion transmission unit(s) information 382 includes information identifying one or more additional transmission units, e.g., one or more additional OFDM tone-symbols, to be used for conveying a QoS level of a traffic transmission request response signal for connection with connection ID 1 in the transmission request response block for traffic transmission slot 1 in the recurring timing structure.

Received signals 350 include, e.g., connection establishment signals, traffic transmission request signals corresponding to connections of which wireless terminal 300 is a member, traffic transmission request signals corresponding to connections of which wireless terminal 300 is not a member, traffic transmission request response signals corresponding to a connection of which wireless terminal 300 is a member, traffic transmission request response signals corresponding to connections of which wireless terminal 300 is not a member, and traffic signals, e.g., peer to peer traffic signals.

Generated signals 350 include, e.g., connection establishment signals, traffic transmission request signals corresponding to connections of which wireless terminal 300 is a member, traffic transmission request response signals corresponding to a connection of which wireless terminal 300 is a member, and traffic signals, e.g., peer to peer traffic signals.

Quality of service determination module 326 determines a quality of service level to be used for data to be transmitted by wireless terminal 300 to another wireless terminal, with which wireless terminal 300 has a connection, in a traffic transmission slot. For example, quality of service determination module 326 determines a first quality of service level to be used for data to be transmitted in a first traffic transmission slot when wireless terminal 300 has data to be transmitted to a second wireless terminal. The determined first quality of service level is, e.g., one of four possible QoS levels. In some embodiments, the determination is performed based on the type of data to be transmitted, e.g., voice, image, file data, etc. In some embodiments, the determination is performed based on latency consideration. In some embodiments, the determination is performed based on transmission queue backlog information. In some embodiments, the determination is based on device or user affiliation information, e.g. a service provider plan to which the device or user subscribes, an affiliation with emergency services, etc. In some embodiments, the determination is based on device capabilities.

Transmission request control module 328 controls the wireless transmitter module 304 to transmit a request signal in a transmission request block corresponding to a traffic transmission slot. For example, transmission request control module 328 controls the wireless transmitter module 304 to transmit a request signal in a first transmission request block corresponding to a first traffic transmission slot, wherein the first transmission request block includes a plurality of transmission unit sets, each transmission unit set in the first transmission request block corresponding to a different connection identifier, and the first transmission request block corresponds to a set of different connection identifiers.

Request signal generation module 330 generates a transmission request signal which includes a request pilot signal portion and a request quality of service level portion. The transmission request control module 328 is configured to control the generated request signal to be communicated using a transmission unit used to communicate the request pilot signal portion and one more additional transmission units to communicate the request quality of service level portion.

Request response monitoring module 332 monitors a transmission request response block corresponding to a traffic transmission segment in a traffic transmission slot for transmission request responses. For example, request response monitoring module 332 monitors a first transmission request response block corresponding to a first traffic transmission slot for transmission request responses, wherein the first transmission request response block includes a plurality of transmission unit sets, each transmission unit set in said first transmission request response block corresponding to one of the different connection identifiers in said set of different connection identifiers.

Transmitter yielding module 324 decides whether or not to transmit in a traffic transmission slot, in which wireless terminal 300 would like to transmit, based on quality of service level information included in request responses detected by the monitoring of the request response block of the traffic transmission slot. For example, transmitter yielding module 334 decides whether or not to transmit in a first transmission slot based on quality of service level information included in request responses detected by the monitoring of the first transmission request response block.

Interference evaluation sub-module 36 decides not to transmit when a request response: i) corresponding to a connection identifier corresponding to a pair of devices which does not include wireless terminal 300 is received, ii) and the received request response includes a higher quality of service level than the quality of service level associated with wireless terminal 300 connection, e.g., the first quality of service level, and iii) the power level of the received request response exceeds a power level threshold. Thus interference evaluation sub-module 336 stops wireless terminal 300 from proceeding with an intended traffic transmission when the interference from its intended traffic transmission is expected to be unacceptable to another expected traffic transmission which has a higher QoS level.

Transmission clearance sub-module 338 decides to transmit when i) a request response is received in reply to the transmission request signal which wireless terminal 300 transmitted and ii) no request response with a power level above a request response power threshold is received communicating a QoS level higher than the QoS level associated with WT 300's connection, e.g., the first QoS level, is received in a request response block corresponding to the traffic transmission slot under consideration, e.g., the first traffic transmission slot. Thus transmission clearance sub-module 338 allows wireless terminal 300 to proceed with an intended traffic transmission when it has received an acceptable reply to its transmission request and when it is not expected to cause unacceptable interference to other higher QoS level transmissions.

Priority determination sub-module 340 makes a transmission determination for wireless terminal 300 for a traffic transmission slot based on the relative location in the request response block of a response received corresponding to a connection other than its connection and the location of a response received corresponding to its connection when both the received response corresponding to the connection other than its own connection and the received response corresponding to its own connection exceed a response power level threshold and indicate the same quality of service level. Thus in this embodiment, for a quality of service level tie condition between two competing connections seeking to concurrently transmit on the same traffic segment, where concurrent transmission would be unacceptable, priority information conveyed in the position of the request response transmission units is utilized to decide whether or not to transmit.

Power level threshold determination module 342 determines a power level threshold dynamically from one transmission slot to the next based on received signals. Determined thresholds 354 are outputs of module 342 which are used as input by the transmitter yielding module 334.

Transmission request monitoring module 343 detects reception of transmission request signals received by wireless receiver module 302, e.g., a transmission request signal including a quality of service level indicator from a third device with which wireless terminal 300 has a connection. In some embodiments, the transmission request monitoring module includes quality of service level information recovery module, which uses the received pilot signal portion to determine a phase reference and/or a power level reference and then uses the determined phase reference and/or determined power level reference to recover the quality of service level information being communicated in the QoS level signal portion.

Receiver yielding module 344 makes a receiver yielding decision in response to a detected transmission request signal corresponding to a connection of which wireless terminal 300 is a member. Receiver yielding module 344 makes a receiver yielding decision based on the received power level of detected transmission request signals, recovered QoS levels communicated in received transmission request signals and position of detected transmission request signals in a transmission request block.

Request response generation module 345 generates a request response signal when the receiver yielding module 344 decides not to yield. The generated request response signal includes a pilot signal portion and a QoS information portion. In some embodiments, the request response generation module 345 includes the same QoS information, e.g. same QoS level, recovered from the corresponding request signal in the request response signal.

Request response control module 346 control the wireless transmitter module to transmit a request response signal including a quality of service level indicator. For example, corresponding to a particular traffic transmission slot and a connection of which wireless terminal 300 is a member, wireless terminal 300 has received a traffic transmission request, and the receiver yielding module 344 has decided not to yield, then the request response control module 346 controls the wireless transmitter module 304 to transmit the generated request response signal from module 346, the generated request response signal including the quality of service level indicated in the corresponding received transmission request signal.

Traffic module 347 generates peer to peer traffic signals and controls the wireless transmitter module 304 to transmit the generated peer to peer traffic signals in the appropriate traffic segment when a transmission request has been transmitted, a corresponding request response has been received, and the transmitter yielding module 334 has decided not to yield. Traffic module 347 controls the wireless receiver module 302 to attempt to receive peer to peer traffic signals in the appropriate traffic segment and processes received traffic signals to recover traffic data when a transmission request was received directed to wireless terminal 300 was received and receiver yielding module 344 decided not too yield.

Figure 4:
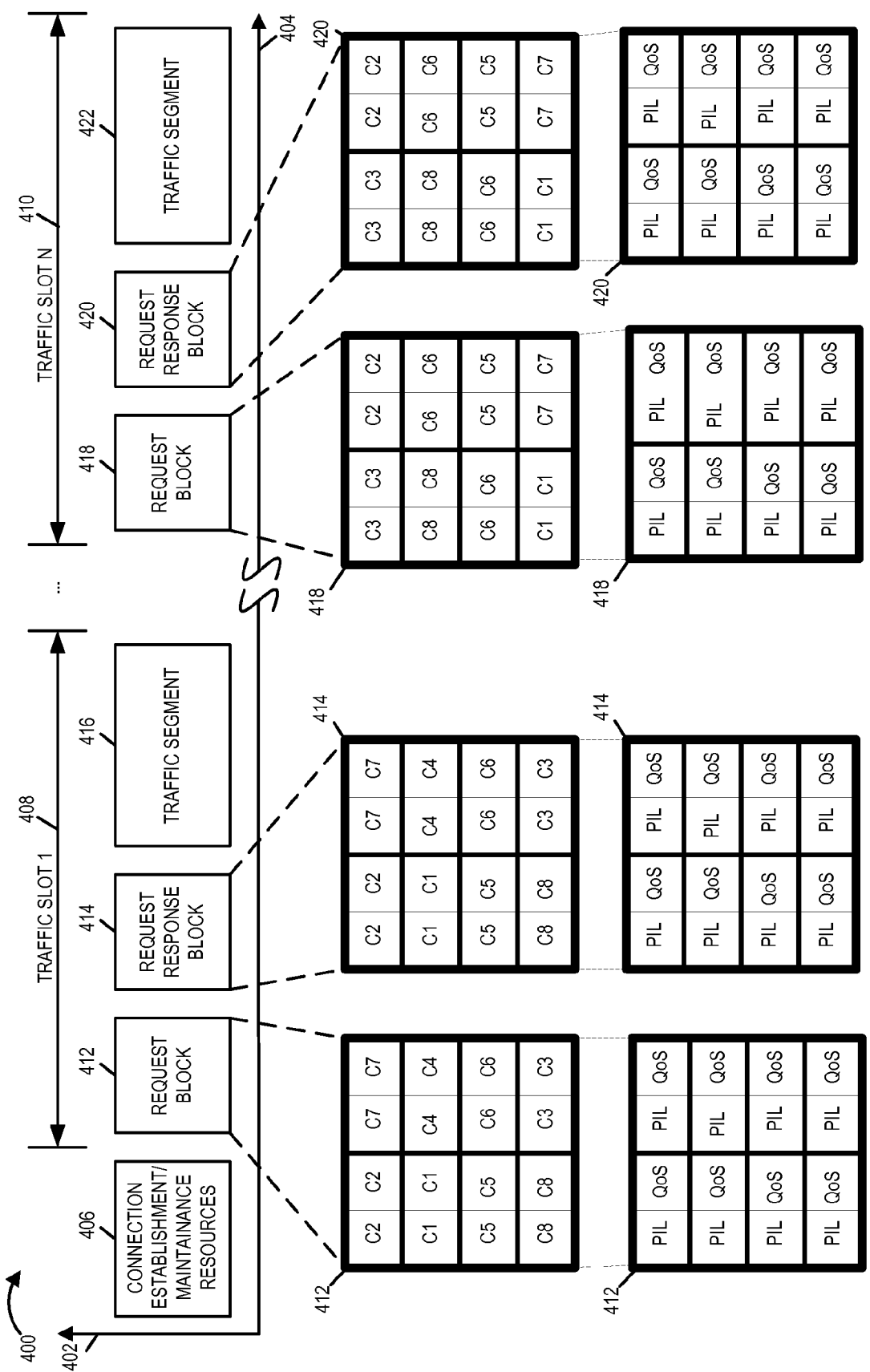
FIG. 4 is a drawing illustrating an exemplary recurring peer to peer timing/frequency structure used in some embodiments.

FIG. 4 is a drawing 400 illustrating an exemplary recurring peer to peer timing/frequency structure used in some embodiments. For example, the timing/frequency structure represented by FIG. 4 is one exemplary embodiment of the timing/frequency structure represented by timing/frequency structure information 348 of wireless terminal 300 of FIG. 3.

Drawing 400 includes a vertical axis 402 representing frequency, e.g., OFDM tones, and a horizontal axis 404 representing time. The air link resources include connection establishment maintenance air link resources 406 and air link resources corresponding to a plurality of traffic slots (traffic slot 1 408, . . . , traffic slot N 410). Traffic slot 1 408 includes request block 412, request response block 414 and traffic segment 416. Traffic slot N 410 includes request block 418, request response block 420 and traffic segment 422.

Request block 412 includes 8 transmission unit sets, each transmission unit set in transmission request block 412 corresponds to a different connection identifier, and the transmission request block 412 corresponds to a set of 8 different connection identifiers (C1, C2, C3, C4, C5, C6, C7, C8). In this exemplary embodiment each transmission unit set includes two transmission units. A transmission unit set is used to carry a traffic transmission request signal requesting to use transmit traffic signals in the traffic segment 416. The first transmission unit of the set is designated to be used to carry a traffic transmission request pilot signal corresponding to the connection and the second transmission unit of the set is designated to carry a QoS level corresponding to the connection.

Request response block 414 includes 8 transmission unit sets, each transmission unit set in transmission request response block 414 corresponds to a different connection identifier, and the transmission request response block 414 corresponds to a set of 8 different connection identifiers (C1, C2, C3, C4, C5, C6, C7, C8). In this exemplary embodiment each transmission unit set includes two transmission units. A transmission unit set is used to carry a traffic transmission request response signal, e.g., an RX echo signal, responding to a corresponding received traffic transmission request signal and communicating a positive response to proceed with the intended requested traffic signaling in traffic segment 416. The first transmission unit of the set is designated to be used to carry a traffic transmission request response pilot signal corresponding to the connection and the second transmission unit of the set is designated to carry a QoS level corresponding to the connection, e.g., a repeat of the QoS level received in the corresponding request signal.

Request block 418 includes 8 transmission unit sets, each transmission unit set in transmission request block 418 corresponds to a different connection identifier, and the transmission request block 418 corresponds to a set of 8 different connection identifiers (C1, C2, C3, C4, C5, C6, C7, C8). In this exemplary embodiment each transmission unit set includes two transmission units. A transmission unit set is used to carry a traffic transmission request signal requesting to use transmit traffic signals in the traffic segment 422. The first transmission unit of the set is designated to be used to carry a traffic transmission request pilot signal corresponding to the connection and the second transmission unit of the set is designated to carry a QoS level corresponding to the connection.

Request response block 420 includes 8 transmission unit sets, each transmission unit set in transmission request response block 420 corresponds to a different connection identifier, and the transmission request response block 420 corresponds to a set of 8 different connection identifiers (C1, C2, C3, C4, C5, C6, C7, C8). In this exemplary embodiment each transmission unit set includes two transmission units. A transmission unit set is used to carry a traffic transmission request response signal, e.g., an RX echo signal, responding to a corresponding received traffic transmission request signal and communicating a positive response to proceed with the intended requested traffic signaling in traffic segment 422. The first transmission unit of the set is designated to be used to carry a traffic transmission request response pilot signal corresponding to the connection and the second transmission unit of the set is designated to carry a QoS level corresponding to the connection, e.g., a repeat of the QoS level received in the corresponding request signal.

It should be observed that the position of a transmission unit set in a request block and a request response block associated with a particular connection identifier is different in traffic slot 1 408 as compared to traffic slot N 410, e.g., in accordance with an implemented hopping sequence. Priority information is associated with position of a transmission unit set in a request block and a request response block. For example, priority information associated with position of a transmission unit in a request block or request response block is used a tie-breaker when deciding a receiver yielding decision or transmitter yielding decision when the QoS level associated with two competing traffic transmission requests or two competing traffic transmission request responses is the same.

Figure 5:
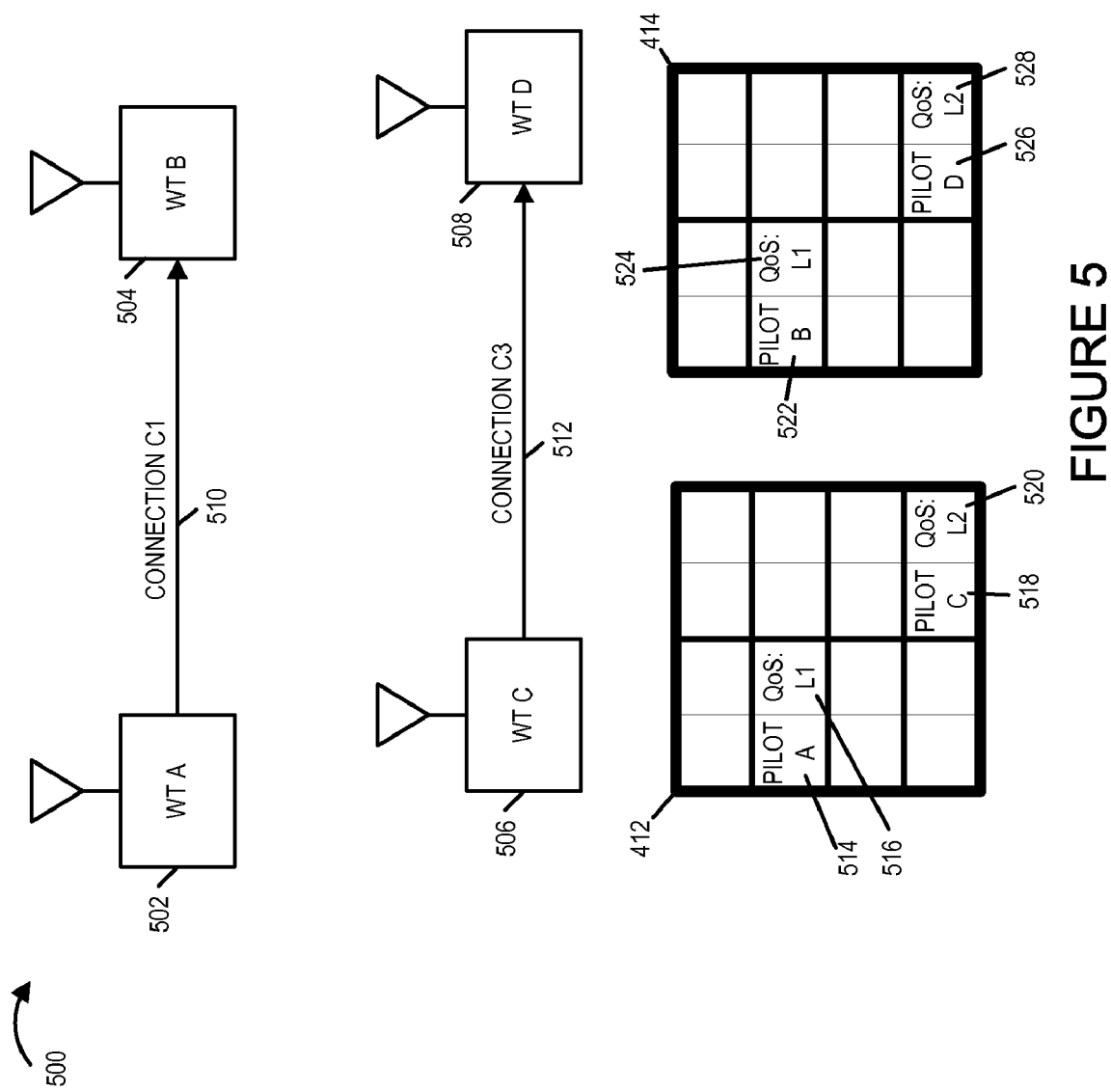
FIG. 5 is a drawing of two pairs of wireless terminals, which have existing peer to peer connections, and illustrates exemplary request and request response signaling for one traffic transmission slot.

FIG. 5 is a drawing of two pairs of wireless terminals, which have existing peer to peer connections, and illustrates exemplary request and request response signaling for one traffic transmission slot. The wireless terminals of FIG. 5 are, e.g., any of the communications devices of FIG. 1, a device implementing the method of flowchart 200 of FIG. 2 and/or a device in accordance with exemplary wireless terminal 300 of FIG. 3. First pair of wireless terminals (WT A 502, WT B 504) currently have connection C1 510 associated with peer to peer traffic signaling from WT A 502 to WT B 504. Second pair of wireless terminals (WT C 506, WT D 508) currently have connection C3 512 associated with peer to peer traffic signaling from WT C 506 to WT D 508.

Assume that the wireless terminals (502, 504, 506, 508) are using the peer to peer timing structure of FIG. 4, that WT A 502 would like to transmit peer to peer traffic signals to WT B 504 in traffic segment 416 of traffic slot 1 408, and that WT C 506 would like to transmit peer to peer traffic signals to WT D 508 in traffic segment 416 of traffic slot 1 408. Wireless terminal A 502 generates and transmits a traffic transmission request signal to WT B 504. The generated traffic transmission request signal includes: i) a pilot portion communicated on a first transmission unit of the transmission unit set associated with its connection identifier (C1) in request block 412 as indicated by pilot A designation in OFDM tone-symbol 514; and ii) a Quality of Service (QoS) information portion communicated on a second transmission unit of the transmission unit set associated with its connection identifier (C1) in request block 412 as indicated by QoS: L1 in OFDM tone-symbol 516. Wireless terminal C 506 generates and transmits a traffic transmission request signal to WT D 508. The generated traffic transmission request signal includes: i) a pilot portion communicated on a first transmission unit of the transmission unit set associated with its connection identifier (C3) in request block 412 as indicated by pilot C designation in OFDM tone-symbol 518; and ii) a Quality of Service (QoS) information portion communicated on a second transmission unit of the transmission unit set associated with its connection identifier (C3) in request block 412 as indicated by QoS: L2 in OFDM tone-symbol 520. Assume L1 represents a first Quality of Service level and L2 represents a second Quality of Service level which may be, and sometimes is different from L1.

Wireless terminal B 504 monitors request block 412 for transmission request signals corresponding to its own connection and other connections. Assume that WT B 504 detects the transmission request signal from WT A 502 corresponding to its own connection (C1) and detects the transmission request signal from WT C 506 corresponding to connection C3. Wireless terminal B 502 measures the received power of the detected request signals, e.g., from the pilot signal portions. Wireless terminal B 504 also recovers information, e.g., a phase reference and/or a power reference, from each of the detected pilot signal portions on transmission units (514, 518), and uses the recovered information to evaluate the corresponding quality of service information portions on transmission units (516, 520), respectively, to recover the Quality of service level information bits being communicated. In some embodiments, the QoS level is communicated as a QPSK signal. In some embodiments, the QoS level is communicated as a BPSK signal. WT B 504 makes a receiver yielding decision based on the received power level of the detected request signals and the QoS level information communicated. In some embodiments, at times, WT B 504 also makes the receiver yielding decision based on the positions of detected requests within the request block 412. If WT B 504 decides not to yield, WT B 504 generates and transmits a request response signal, e.g., an RX echo signal, to WT A 502. Such a generated request response signal includes: i) a pilot signal portion on a first transmission unit of the transmission unit set associated with its connection identifier (C1) in request response block 414 as indicated by pilot B designation in OFDM tone-symbol 522 of request response block 414; and ii) a Quality of Service (QoS) information portion communicated on a second transmission unit of the transmission unit set associated with its connection identifier (C1) in request response block 414 as indicated by QoS: L1 in OFDM tone-symbol 524. In this exemplary embodiment, the QoS level communicated in the request response signal is an echo of the QoS level communicated in the corresponding request signal. If WT B 504 decides to perform receiver yielding, indicating that WT B is not giving WT A 502 its approval to proceed with transmitting traffic, WT B refrains from transmitting a request response signal in the request response transmission unit set associated with its connection identifier (C1), namely WT B 504 refrains from transmitting on the transmission units (522, 524) of request response block 414.

Wireless terminal D 508 monitors request block 412 for transmission request signals corresponding to its own connection and other connections. Assume that WT D 508 detects the transmission request signal from WT C 506 corresponding to its own connection (C3) and detects the transmission request signal from WT A 502 corresponding to connection C1. Wireless terminal D 508 measures the received power of the detected request signals, e.g., from the pilot signal portions. Wireless terminal D 508 also recovers information, e.g., a phase reference and/or a power reference, from each of the detected pilot signal portions on transmission units (518, 514), and uses the recovered information to evaluate the corresponding quality of service information portions on transmission units (520, 516), respectively, to recover the Quality of service level information bits being communicated. In some embodiments, the QoS level is communicated as a QPSK signal. In some embodiments, the QoS level is communicated as a BPSK signal. WT D 508 makes a receiver yielding decision based on the received power level of the detected request signals and the QoS level information communicated. In some embodiments, at times, WT D 508 also makes the receiver yielding decision based on the positions of detected requests within the request block 412. If WT D 508 decides not to yield, WT D 508 generates and transmits a request response signal, e.g., an RX echo signal, to WT C 506. Such a generated request response signal includes: i) a pilot signal portion on a first transmission unit of the transmission unit set associated with its connection identifier (C3) in request response block 414 as indicated by pilot D designation in OFDM tone-symbol 526 of request response block 414; and ii) a Quality of Service (QoS) information portion communicated on a second transmission unit of the transmission unit set associated with its connection identifier (C3) in request response block 414 as indicated by QoS: L2 in OFDM tone-symbol 528. In this exemplary embodiment, the QoS level communicated in the request response signal is an echo of the QoS level communicated in the corresponding request signal. If WT D 508 decides to perform receiver yielding, indicating that WT D 508 is not giving WT C 506 its approval to proceed with transmitting traffic, WT D 508 refrains from transmitting a request response signal in the request response transmission unit set associated with its connection identifier (C3), namely WT D 508 refrains from transmitting on the transmission units (526, 528) of request response block 414.

Wireless terminal A 502 monitors request response block 414 for transmission request response signals corresponding to its own connection and other connections. Assume that WT A 502 detects the transmission request response signal from WT B 504 corresponding to its own connection (C1) and detects the transmission request response signal from WT D 508 corresponding to connection C3. Wireless terminal A 502 measures the received power of the detected request response signals, e.g., from the pilot signal portions. Wireless terminal A 502 also recovers information, e.g., a phase reference and/or a power reference, from each of the detected pilot signal portions on transmission units (522, 526), and uses the recovered information to evaluate the corresponding quality of service information portions on transmission units (524, 528), respectively, to recover the Quality of service level information bits being communicated. In some embodiments, the QoS level is communicated as a QPSK signal. In some embodiments, the QoS level is communicated as a BPSK signal. In some embodiments, where the QoS level in the request response signal is an echo of the QoS level in the corresponding request signal, WT A 502 need not and does not recover the QoS information corresponding to its own connection since it already knows the QoS level. WT A 502 makes a transmitter yielding decision based on the received power level of the detected request response signals and the QoS level information communicated. In some embodiments, at times, WT A 502 also makes the transmitter yielding decision based on the positions of detected request responses within the request response block 414. If WT A 502 decides not to yield, WT A 502 generates and transmits peer to peer traffic signals to WT B 504 in traffic segment 416. If wireless terminal A 502 decides to perform transmitter yielding WT A 502 refrains from transmitting peer to peer traffic signals in traffic segment 416.

Wireless terminal C 506 monitors request response block 414 for transmission request response signals corresponding to its own connection and other connections. Assume that WT C 506 detects the transmission request response signal from WT D 508 corresponding to its own connection (C3) and detects the transmission request response signal from WT B 504 corresponding to connection C1. Wireless terminal C 506 measures the received power of the detected request response signals, e.g., from the pilot signal portions. Wireless terminal C 506 also recovers information, e.g., a phase reference and/or a power reference, from each of the detected pilot signal portions on transmission units (526, 522), and uses the recovered information to evaluate the corresponding quality of service information portions on transmission units (528, 524), respectively, to recover the Quality of service level information bits being communicated. In some embodiments, the QoS level is communicated as a QPSK signal. In some embodiments, the QoS level is communicated as a BPSK signal. In some embodiments, where the QoS level in the request response signal is an echo of the QoS level in the corresponding request signal, WT C 506 need not and does not recover the QoS information corresponding to its own connection since it already knows the QoS level. WT C 506 makes a transmitter yielding decision based on the received power level of the detected request response signals and the QoS level information communicated. In some embodiments, at times, WT C 506 also makes the transmitter yielding decision based on the positions of detected request responses within the request response block 414. If WT C 502 decides not to yield, WT C 506 generates and transmits peer to peer traffic signals to WT D 508 in traffic segment 416. If wireless terminal C 506 decides to perform transmitter yielding WT C 506 refrains from transmitting peer to peer traffic signals in traffic segment 416.

It should be appreciated that the use of a pilot signal portion within a request or request response signal facilities recovery of the corresponding quality of service information also being conveyed by the request or request response signal by a plurality of different receivers which may have different channel conditions with respect to the transmitter device.

Figure 6:
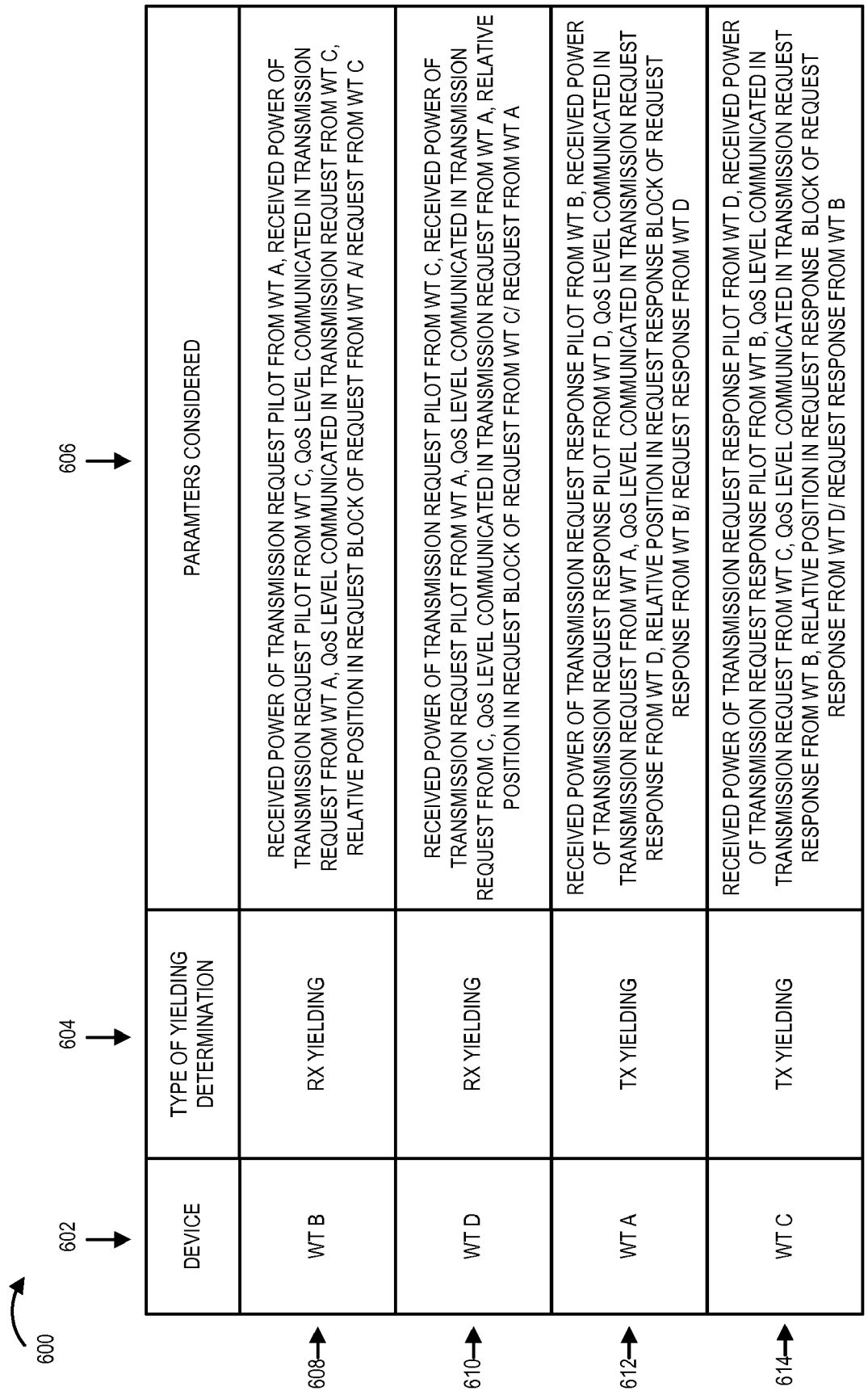
FIG. 6 is a table illustrating exemplary yielding determination parameter considerations corresponding to the example of FIG. 5.

FIG. 6 is a table 600 illustrating exemplary yielding determination parameter considerations corresponding to the example of FIG. 5. First column 602 identifiers the devices; second column 604 identifies the type of yielding determination; and third column 606 identifies parameters considered in the yielding determination. First row 608 identifies that WT B makes an RX yielding determination based on: received power of the transmission request pilot from WT A, the received power of the transmission request pilot from WT C, the QoS level communicated in the transmission request from WT A, the QoS level communicated in the transmission request from WT C, and relative position in the request block of the request from WT A and the request from WT C. Second row 610 identifies that WT D makes an RX yielding determination based on: received power of the transmission request pilot from WT C, the received power of the transmission request pilot from WT A, the QoS level communicated in the transmission request from WT C, the QoS level communicated in the transmission request from WT A, and relative position in the request block of the request from WT C and the request from WT A. Third row 612 identifies that WT A makes a TX yielding determination based on: received power of the transmission request response pilot from WT B, the received power of the transmission request pilot from WT D, the QoS level communicated in the transmission request from WT A, the QoS level communicated in the transmission request response from WT C, and relative position in the request response block of the request response from WT B and the request response from WT D. In some embodiments, the QoS level communicated in a request response is not simply an echo of the QoS signal communicated in a corresponding request signal. In some such embodiments, WT makes its transmitter yielding decision based on the QoS level in the received request response signal from WT B rather than based on the QoS level in the request signal transmitted to WT B. Fourth row 614 identifies that WT C makes an TX yielding determination based on: received power of the transmission request response pilot from WT D, the received power of the transmission request response pilot from WT B, the QoS level communicated in the transmission request from WT C, the QoS level communicated in the transmission request response from WT B, and relative position in the request response block of the request response from WT D and the request response from WT B. In some embodiments, the QoS level communicated in a request response is not simply an echo of the QoS signal communicated in a corresponding request signal. In some such embodiments, WT C makes its transmitter yielding decision based on the QoS level in the received request response signal from WT D rather than based on the QoS level in the request signal transmitted to WT D by WT C.

Figure 7:
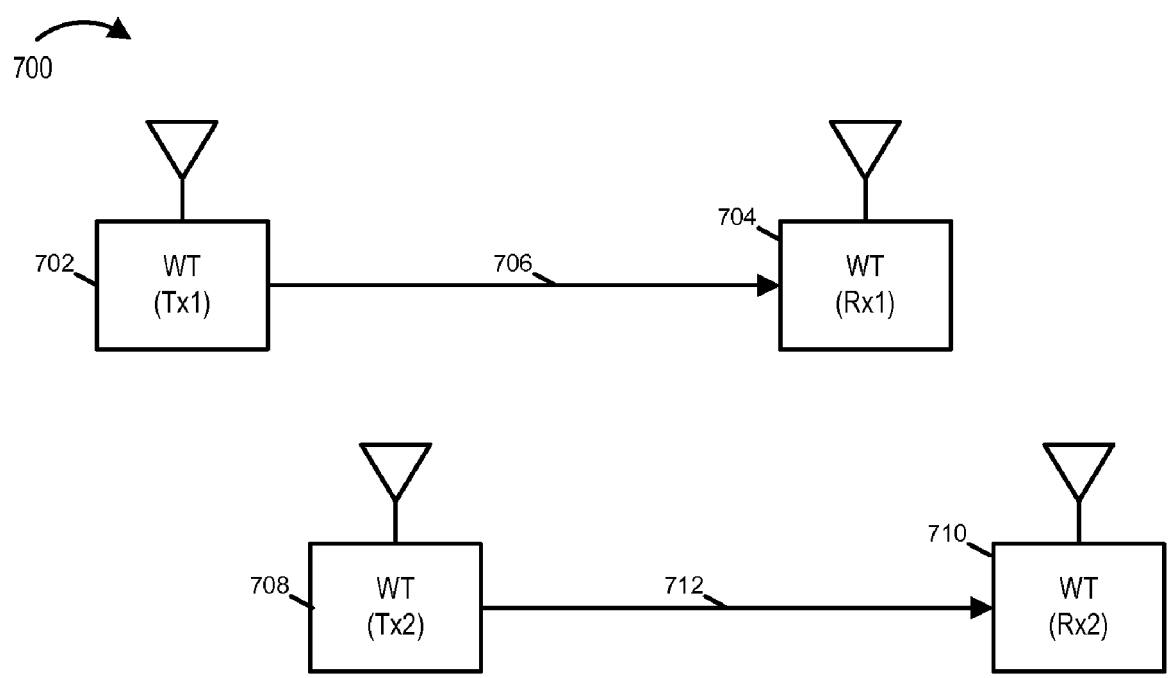
FIG. 7 is a drawing illustrating two pairs of wireless terminals in a peer to peer network.

FIG. 7 is a drawing 700 illustrating two pairs of wireless terminals in a peer to peer network. The first pair includes WT 702, designated as Tx1, and WT 704, designated as Rx1. The first pair has a connection 706 which supports peer traffic signaling from WT 702 to WT 704 on a traffic slot by traffic slot basis. The second pair includes WT 708, designated as Tx2, and WT 710, designated as Rx2. The second pair has a connection 712 which supports peer traffic signaling from WT 708 to WT 710 on a traffic slot by traffic slot basis. The wireless terminal (702, 704, 708, 710), are, e.g., any of the communications devices of FIG. 1, implement methods in accordance with flowchart 200 of FIG. 2 and/or are implemented in accordance with wireless terminal 300 of FIG. 3. Consider a situation where the two transmitters (Tx 1 and Tx 2) want to transmit to receivers (Rx 1 and Rx 2), respectively, simultaneously. The desired transmission are, e.g., peer to peer traffic transmissions. In some embodiments a channel control mechanism is provided by which the transmitters and receivers in a decentralized way decide whether communications Tx1 to Rx1 and Tx2 to Rx2 should orthogonalize or reuse. In cases, where they decide to reuse, in some embodiments, the transmission powers are also decided in a decentralized way. Moreover, the exemplary method also supports Quality of Service (QoS) constraints. For example, if the Tx2 to Rx2 communication has a stricter QoS requirement for the current data slot than the Tx1 to Rx1 communication, then the Tx2 to Rx2 communication will go ahead and the Tx1 to Rx1 communication will go ahead only if its doesn't cause too much degradation to the Tx2 to Rx2 communication. Moreover, the exemplary method works for many simultaneous wireless communications in addition to being suitable for an example with 2 pairs.

Figure 8:
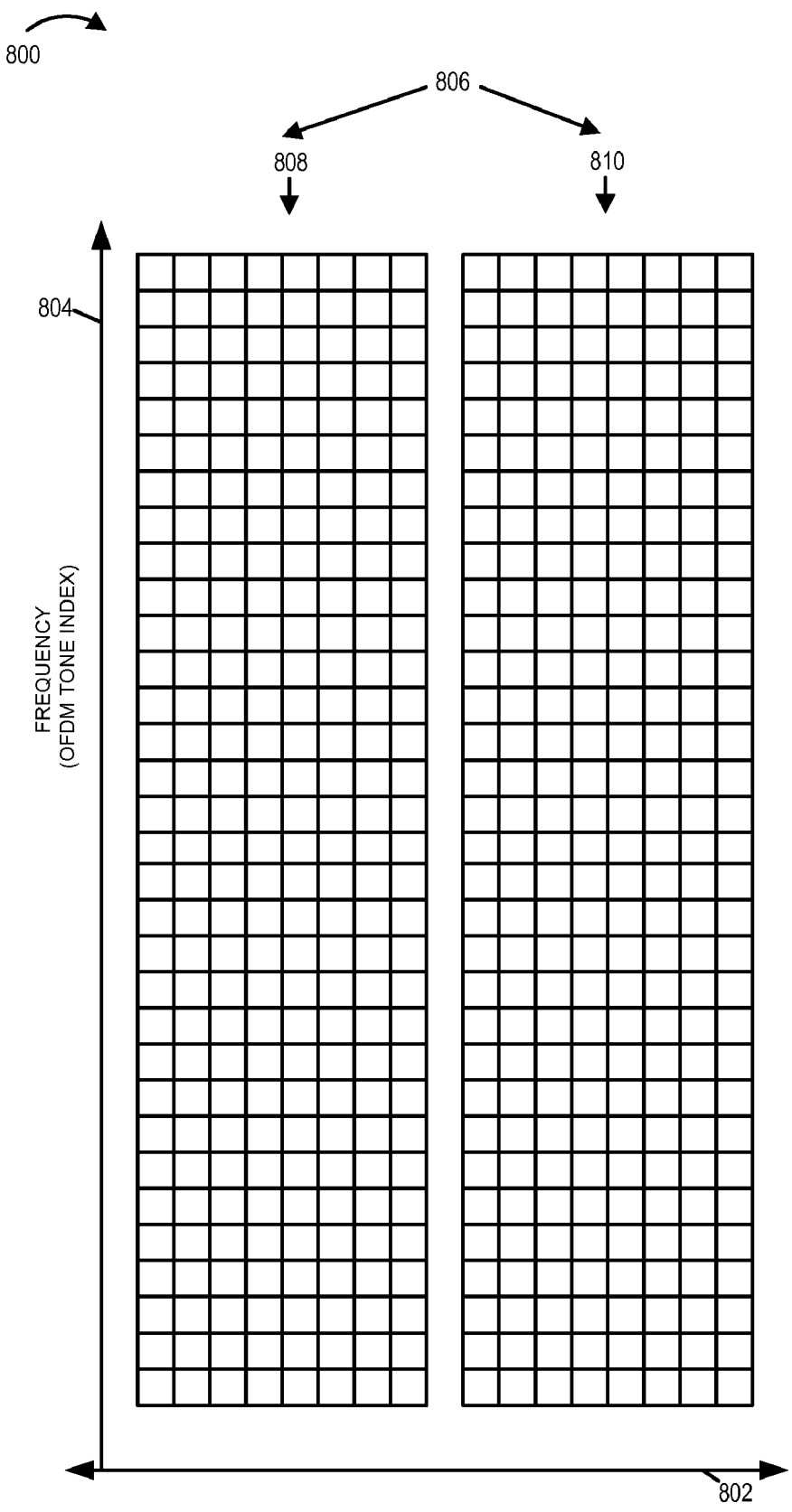
FIG. 8 illustrates an exemplary pre-preamble including a Tx portion, e.g., a traffic transmission request portion and an Rx portion, e.g., a traffic transmission request response portion, in accordance with one exemplary embodiment.

In some embodiments, we assume a synchronized system; each of the Tx-Rx pairs are synchronized because of a central base station, GPS, or some other mechanism. One example of a device used to for synchronization is reference signal transmitter 116 of FIG. 1. In some embodiments, each data burst is synchronized and starts with a control channel that is used for collision resolutions. For the structure of this control channel, in some embodiments, there are short symbols and multiple Tx-Rx steps. In some other embodiments, there is a single Tx-Rx step. Consider one example in which the control channel, e.g., a pre-preamble, includes a Tx portion, sometimes otherwise referred to as a transmission request block, and a RX portion, sometimes otherwise referred to as a request response block. In one such embodiment, each portion has 8 short OFDM symbols of 32 tones each, which implies 256 orthogonal degrees of freedom. Drawing 800 of FIG. 8 illustrates such an exemplary implementation. Horizontal axis 802 represents time index, e.g., OFDM symbol transmission time intervals, while vertical axis 804 represents frequency, e.g., OFDM tone index. The pre-preamble 806, sometimes alternative referred to as a traffic slot scheduling portion, includes a Tx portion 808 and an Rx portion 810. Tx portion 808, sometimes referred to as a traffic transmission request block, includes 8 OFDM symbols with each OFDM symbol including 32 tones. Rx portion 810, sometimes referred to as a traffic transmission request response block, includes 8 OFDM symbols with each OFDM symbol including 32 tones.

Now assume each of the active connections have an orthogonal MAC ID, where MAC IDs are in the range of 1 to 128. Further assume that a typical connection is bi-direction, and therefore, the connection will grab two orthogonal MAC IDs, one for each direction of traffic flow. Assume that a timing structure is utilized with indexed data slots. Based on the orthogonal MAC ID and the current data slot, two tones are picked by the transmitter in the Tx portion to make the request. In some embodiments, the two tones associated with a MAC ID are the same tone for two consecutive OFDM symbols. The mapping from MAC ID to these two tones is known to each of the devices. The request is indicated by energy on the first tone, while QoS information is sent using the second tone. The QoS information on the second tone is decoded using the first tone as the pilot tone. Similarly, the receivers if they hear a request from their intended transmitters, and if they chose to accept the request, decide to echo back the QoS information using the corresponding two tones in the Rx portion.

It may be observed that this design allows each of the receivers to hear each of the transmitters and their QoS information. This approach also allows the transmitters to hear each of the receivers that have decided to accept the request and their QoS information. Note that the two tone design, in some embodiments, supports up to 2 QoS bits for reasonable SNR range. In some other embodiments, in which more QoS bits are needed, more tones are assigned for each orthogonal MAC ID, e.g., three tones with one tone being used as a pilot tone and two additional tones being used to carry the QoS information bits.

Now a notion of priority may be, and sometimes is, linked to the tone used to make the request, and possibly the data burst ID, i.e., the notion of priority changes from data burst to data burst, and the QoS bits. Thus priority can be based on: (i) the position of the transmission unit used to carry the request in the Rx portion, (ii) the traffic slot in the timing structure, and (iii) QoS bits. In one example, for the two Tx-Rx pairs, Tx1-Rx1 and Tx2-Rx2, Tx1-Rx1 is higher priority if: (1) either QoS of Tx1 is higher than QoS of Tx2 or (2) if QoS of Tx1 is equal to QoS of Tx2, but the priority assigned to the tone that Tx-1 uses to make a request is higher than the priority assigned to the tone that Tx2 uses.

So amongst each of the Tx-Rx pairs that can hear each other, there is a well defined notion of a priority that holds for the current data slot. Thus for a given transmission pair, a transmitter may decide to yield, e.g., to not send data in the current data slot, based on higher priority receivers. A receiver may decide to yield based on higher priority transmitters.

Figure 9:
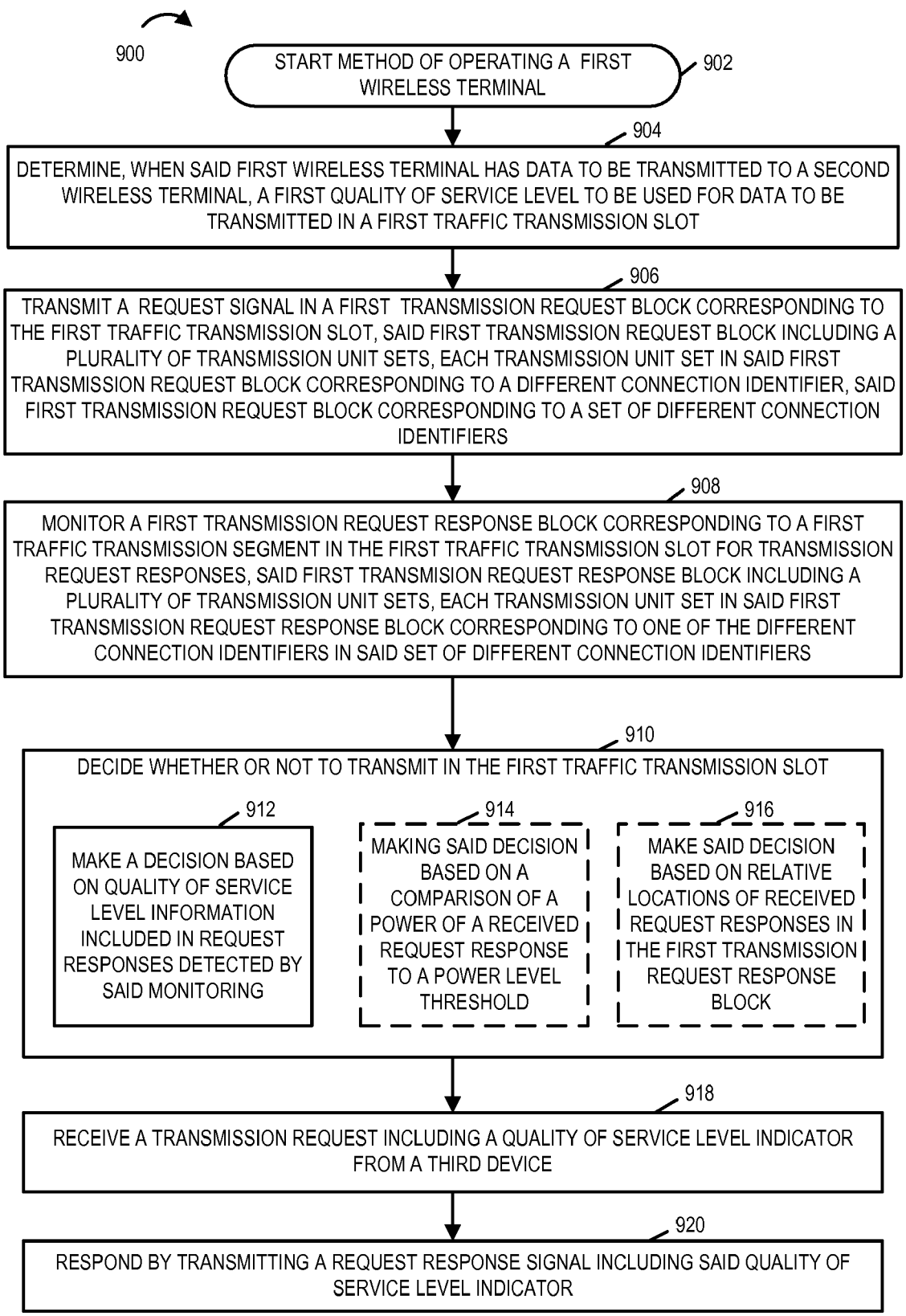
FIG. 9 is a flowchart of an exemplary method of operating a first wireless terminal in accordance with an exemplary embodiment.

FIG. 9 is a flowchart 900 of an exemplary method of operating a first wireless terminal. Operation of the exemplary method starts in step 902 and proceeds to step 904. In step 904, the first wireless terminal determines, when said first wireless terminal has data to be transmitted to a second wireless terminal, a first quality of service level to be used for data to be transmitted in a first traffic transmission slot. Operation proceeds from step 904 to step 906.

In step 906, the first wireless terminal transmits a request signal in a first transmission request block corresponding to the first traffic transmission slot, said first transmission request block including a plurality of transmission unit sets, each transmission unit set in said first transmission request block corresponding to a different connection identifier, said first transmission request block corresponding to a set of different connection identifiers. In some embodiments, the request signal is communicated using a transmission unit used to communicate a request pilot signal and one or more additional transmission units used to communicate said first quality of service level. Operation proceeds from step 906 to step 908.

In step 908 the first wireless terminal monitors a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers. Operation proceeds from step 908 to step 910.

In step 910 the first wireless terminal decides whether or not to transmit in the first traffic transmission slot. Step 910 includes sub-step 912. In some embodiments, step 910 includes one or more of sub-steps 914 and 916. In sub-step 912 the first wireless terminal makes a decision whether or not to transmit in the first traffic transmission slot based on quality of service level information included in request responses detected by said monitoring. In sub-step 914, the first wireless terminal makes said decision based on a comparison of a power of a received request response to a power level threshold. In some embodiments, the power level threshold is dynamically determined from one transmission time slot to the next based on received signals. In sub-step 916 the first wireless terminal makes said decision based on relative locations of received request responses in the first transmission request response block.

In one example, the first wireless terminal may decide not to transmit because it has detected a request response corresponding to another connection, of which it is not a participant, which has a higher quality of service level than the quality of service level corresponding to its own connection. In such a scenario the first wireless terminal decides to yield to the connection with the higher quality of service level.

In another example, the first wireless terminal may decide to transmit because it has not detected any request responses corresponding to other connections which exceed a power level threshold and which have a quality of service level higher than its own quality of service level. Thus the first wireless terminal does not yield since it has the highest quality of service level.

In yet another example, the first wireless terminal has the same quality of service level as that of another connection. In one such scenario the first wireless terminal uses relative location information of request responses in the request response block to make the decision. For example, the position of a request response in the transmission request response block may be associated with priority information, and the priority information may be used as a tie breaker criteria in the event of a tie based on quality of service level information corresponding to two requests with the same quality of service level competing to use the same traffic segment.

Operation proceeds from step 910 to step 918. In step 918 the first wireless terminal receives a transmission request including a quality of service level indicator from a third device. Then in step 920 the first wireless terminal responds by transmitting a request response signal including said quality of service level indicator. Steps 918 and 920 may correspond to a second traffic transmission slot.

Figure 10:
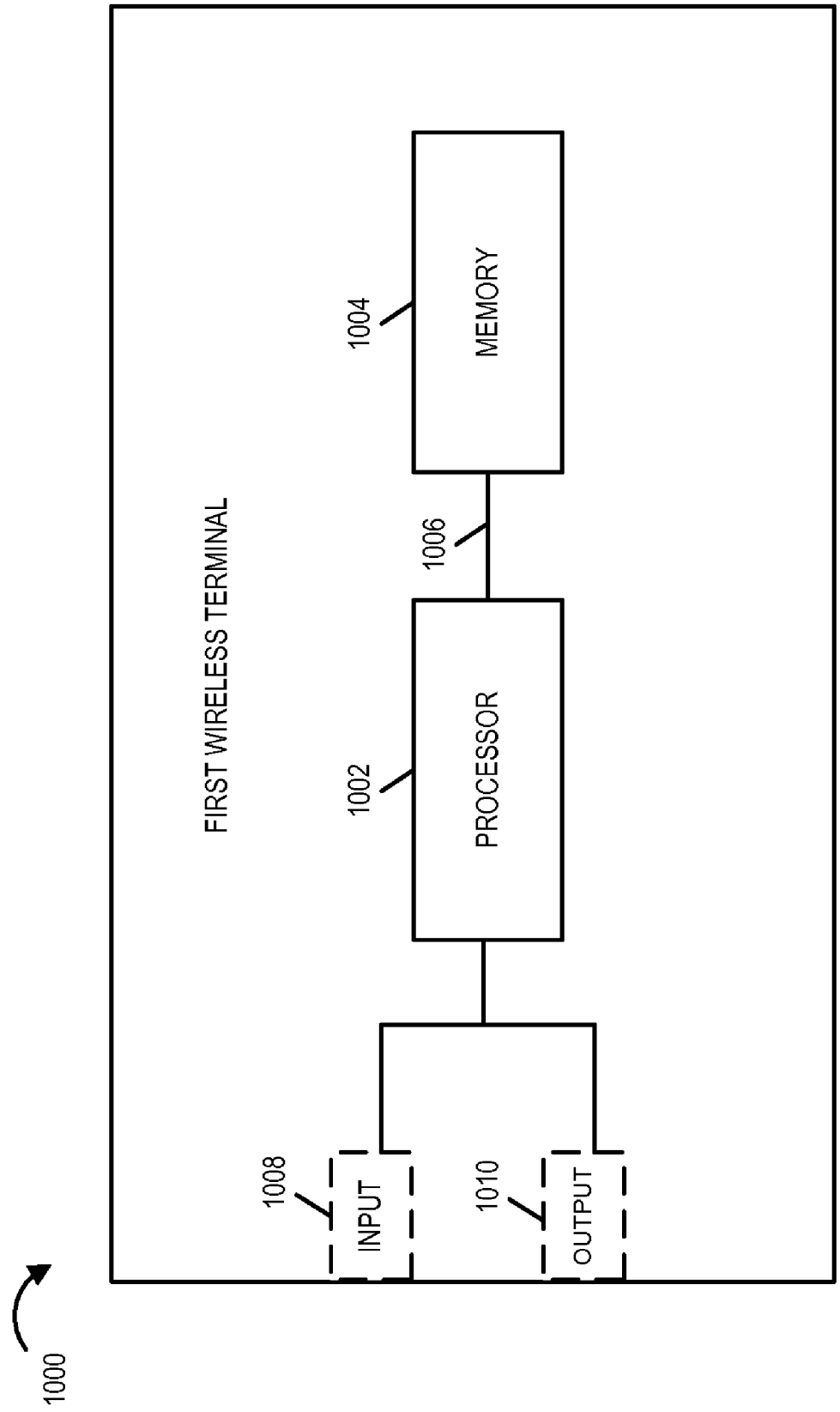
FIG. 10 is a drawing of an exemplary first wireless terminal in accordance with an exemplary embodiment.

FIG. 10 is a drawing of an exemplary first wireless terminal 1000 in accordance with an exemplary embodiment. Exemplary first wireless terminal 1000 is, e.g., a wireless terminal such as a mobile node supporting peer to peer communications and implementing a method in accordance with flowchart 900 of FIG. 9.

First wireless terminal 1000 includes a processor 1002 and memory 1004 coupled together via a bus 1006 over which the various elements (1002, 1004) may interchange data and information. First wireless terminal 1000 further includes an input module 1008 and an output module 1010 which may be coupled to processor 1002 as shown. However, in some embodiments, the input module 1008 and output module 1010 are located internal to the processor 1002. Input module 1008 can receive input signals. Input module 1008 can, and in some embodiments does, include a wireless receiver and/or a wired or optical input interface for receiving input. Output module 1010 may include, and in some embodiments does include, a wireless transmitter and/or a wired or optical output interface for transmitting output.

Processor 1002 is configured to: determine, when said first wireless terminal has data to be transmitted to a second wireless terminal, a first quality of service level to be used for data to be transmitted in a first traffic transmission slot; and transmit a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers. In some embodiments, said request signal is communicated using a transmission unit used to communicate a request pilot signal and one or more additional transmission units used to communicate said first quality of service level.

In various embodiments, the processor 1002 is further configured to monitor a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers.

The processor 1002, in some embodiments, is further configured to decide whether or not to transmit in the first traffic transmission slot based on quality of service level information included in request responses detected by said monitoring. In some such embodiments the processor 1002 is further configured to decide whether or not to transmit in the first traffic transmission slot based on a comparison of a power of a received request response to a power level threshold. In various embodiments, said power level threshold is dynamically determined from one transmission time slot to the next based on received signals. The processor 1002 is configured, in some embodiments, to decide whether or not to transmit in the first transmission slot based on relative locations of received request responses in the first transmission request response block.

Processor 1002, in some embodiments is configured to: receive a transmission request including a quality of service level indicator from a third device; and respond by transmitting a request response signal including said quality of service level indicator.

Figure 11:
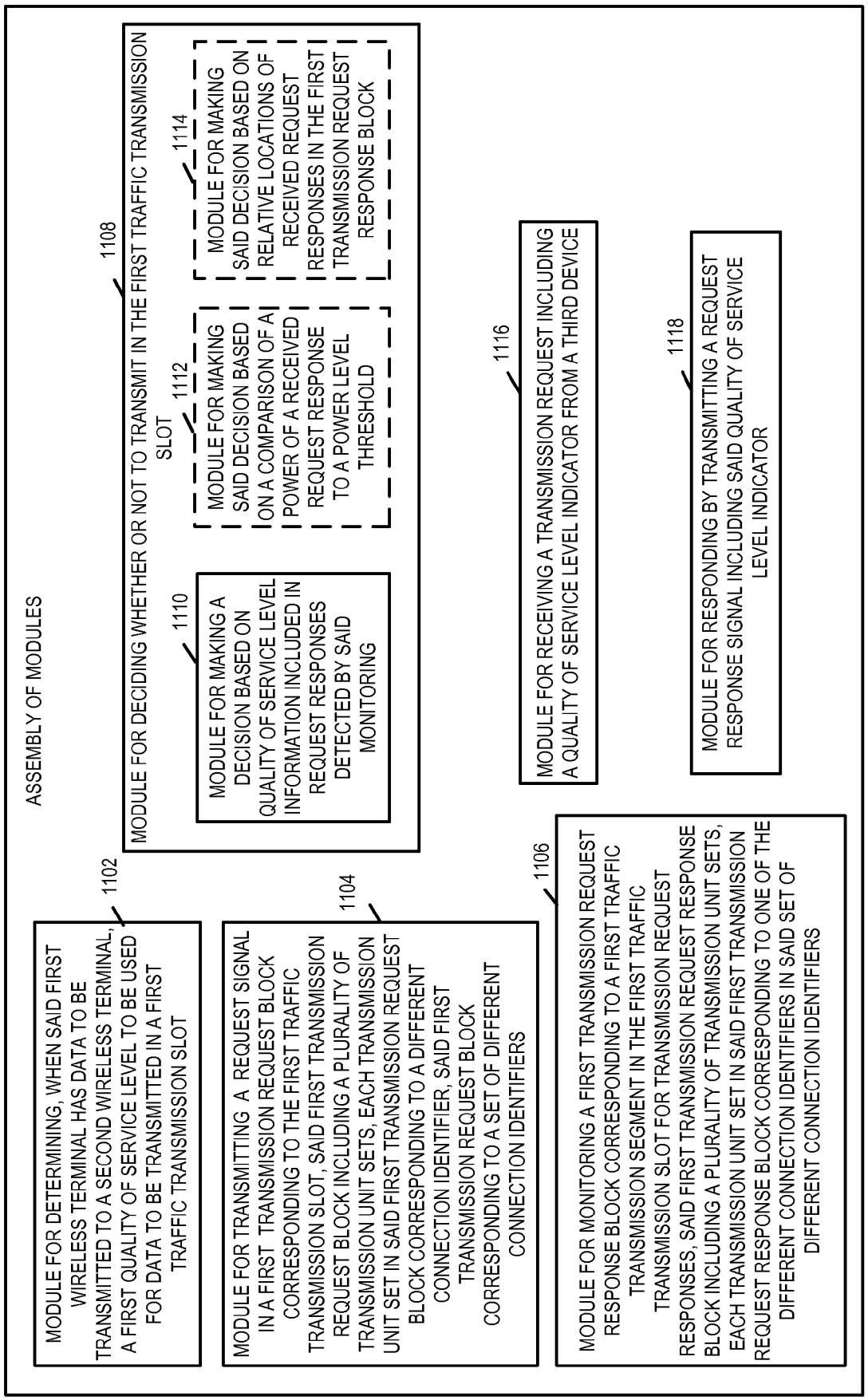
FIG. 11 is an assembly of modules which can, and in some embodiments are, used in the first wireless terminal 1000 illustrated in FIG. 10.

FIG. 11 is an assembly of modules 1100 which can, and in some embodiments are, used in the first wireless terminal 1000 illustrated in FIG. 10. The modules in the assembly 1100 can be implemented in hardware within the processor 1002 of FIG. 10, e.g., as individual circuits. Alternatively, the modules may be implemented in software and stored in the memory 1004 of the first wireless terminal 1000 shown in FIG. 10. While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In embodiments where the assembly of modules 1100 is stored in the memory 1004, the memory 1004 is a computer program product comprising a computer readable medium comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the first wireless terminal 1000 or elements therein such as the processor 1002, to perform the functions of the corresponding steps illustrated in the method flowchart 900 of FIG. 9.

As illustrated in FIG. 11, the assembly of modules 1100 includes: a module 1102 for determining, when said first wireless terminal has data to be transmitted to a second wireless terminal, a first quality of service level to be used for data to be transmitted in a first traffic transmission slot; and a module 1104 for transmitting a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers. In some embodiments, said request signal is communicated using a transmission unit used to communicate a request pilot signal and one or more additional transmission units used to communicate said first quality of service level.

The assembly of modules 1100 further includes: a module 1106 for monitoring a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers; and a module 1108 for deciding whether or not to transmit in the first traffic transmission slot. Module 1108 includes module 1110 for making a decision whether or not to transmit in the first traffic transmission slot based on quality of service level information included in request responses detected by said monitoring. In some embodiments, module 1108 includes one or more of: module 1112 for making said decision based on a comparison of a power of a received request response to a power level threshold and module 1114 for making said decision based on relative locations of received request responses in the first transmission request response block. In some embodiments, said power level threshold is dynamically determined from one transmission time slot to the next based on received signals.

The assembly of modules 1100 further includes a module 1116 for receiving a transmission request including a quality of service level indicator from a third device; and a module 1118 for responding by transmitting a request response signal including said quality of service level indicator.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, determining a quality of service level, generating a request signal including a pilot portion and a quality of service portion, transmitting a request signal in a transmission request block, making a transmitter yielding decision, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless terminal, the method comprising:
   when said first wireless terminal has data to be transmitted to a second wireless terminal, determining, at said first wireless terminal, a first quality of service level to be used for data to be transmitted in a first traffic transmission slot; and
   transmitting a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers.

2. The method of claim 1, wherein said request signal is communicated using a transmission unit used to communicate a request pilot signal and one or more additional transmission units used to communicate said first quality of service level.

3. The method of claim 1, further comprising:
   monitoring a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers.

4. The method of claim 3, further comprising:
   deciding whether or not to transmit in the first traffic transmission slot comprising making a decision based on quality of service level information included in request responses detected by said monitoring.

5. The method of claim 4, wherein said deciding whether or not to transmit in the first traffic transmission slot further comprises deciding based on a comparison of a power of a received request response to a power level threshold.

6. The method of claim 5, wherein said power level threshold is dynamically determined from one transmission time slot to the next based on received signals.

7. The method of claim 4, wherein said deciding whether or not to transmit in the first traffic transmission slot further comprises deciding based on relative locations of received request responses in the first transmission request response block.

8. The method of claim 1, further comprising:
   receiving a transmission request including a quality of service level indicator from a third device; and
   responding by transmitting a request response signal including said quality of service level indicator.

9. The method of claim 1, wherein said request signal is transmitted to the second wireless terminal to which said data is to be transmitted.

10. A first wireless terminal comprising
    at least one processor configured to:
      determine, when said first wireless terminal has data to be transmitted to a second wireless terminal, a first quality of service level to be used for data to be transmitted in a first traffic transmission slot; and
      transmit a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers; and a memory coupled to said at least one processor.

11. The first wireless terminal of claim 10, wherein said request signal is communicated using a transmission unit used to communicate a request pilot signal and one or more additional transmission units used to communicate said first quality of service level.

12. The first wireless terminal of claim 10, wherein said at least one processor is further configured to monitor a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers.

13. The first wireless terminal of claim 12, wherein said at least one processor is further configured to decide whether or not to transmit in the first traffic transmission slot based on quality of service level information included in request responses detected by said monitoring.

14. The first wireless terminal of claim 13, wherein said at least one processor is further configured to decide whether or not to transmit in the first traffic transmission slot based on a comparison of a power of a received request response to a power level threshold.

15. The first wireless terminal of claim 14, wherein said power level threshold is dynamically determined from one transmission time slot to the next based on received signals.

16. The first wireless terminal of claim 13, wherein said at least one processor is further configured to decide whether or not to transmit in the first transmission slot based on relative locations of received request responses in the first transmission request response block.

17. The first wireless terminal of claim 10, wherein said at least one processor is further configured to:
receive a transmission request including a quality of service level indicator from a third device; and
respond by transmitting a request response signal including said quality of service level indicator.

18. A first wireless terminal comprising:
means for determining, when said first wireless terminal has data to be transmitted to a second wireless terminal, a first quality of service level to be used for data to be transmitted in a first traffic transmission slot; and
means for transmitting a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers.

19. The first wireless terminal of claim 18, wherein said request signal is communicated using a transmission unit used to communicate a request pilot signal and one or more additional transmission units used to communicate said first quality of service level.

20. The first wireless terminal of claim 18, further comprising:
means for monitoring a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers.

21. The first wireless terminal of claim 20, further comprising:
means for deciding whether or not to transmit in the first traffic transmission slot comprising means for making a decision based on quality of service level information included in request responses detected by said monitoring.

22. The first wireless terminal of claim 21, wherein said means for deciding whether or not to transmit in the first traffic transmission slot further comprises means for deciding based on a comparison of a power of a received request response to a power level threshold.

23. The first wireless terminal of claim 22, wherein said power level threshold is dynamically determined from one transmission time slot to the next based on received signals.

24. The first wireless terminal of claim 21, wherein said means for deciding whether or not to transmit in the first traffic transmission slot further comprises means for deciding based on relative locations of received request responses in the first transmission request response block.

25. The first wireless terminal of claim 18, further comprising:
means for receiving a transmission request including a quality of service level indicator from a third device; and
means for responding by transmitting a request response signal including said quality of service level indicator.

26. A computer program product for use in a first wireless terminal, the computer program product comprising:
a non-transitory computer readable medium comprising:
code for causing at least one computer to determine a first quality of service level to be used for data to be transmitted in a first traffic transmission slot when said first wireless terminal has data to be transmitted to a second wireless terminal; and
code for causing the at least one computer to control transmitting a request signal in a first transmission request block corresponding to said first traffic transmission slot, said first transmission request block including a plurality of transmission unit sets, each transmission unit set in said first transmission request block corresponding to a different connection identifier, said first transmission request block corresponding to a set of different connection identifiers.

27. The computer program product of claim 26, wherein said request signal is communicated using a transmission unit used to communicate a request pilot signal and one or more additional transmission units used to communicate said first quality of service level.

28. The computer program product of claim 26, wherein the non-transitory computer readable medium further comprises:
code for causing the at least one computer to monitor a first transmission request response block corresponding to a first traffic transmission segment in the first traffic transmission slot for transmission request responses, said first transmission request response block including a plurality of transmission unit sets, each transmission unit set in said first transmission request response block corresponding to one of the different connection identifiers in said set of different connection identifiers.

* * * * *